(12) United States Patent
Redford et al.

(10) Patent No.: US 11,041,444 B2
(45) Date of Patent: Jun. 22, 2021

(54) GAS TURBINE ENGINE WITH DIFFERENTIAL GEARBOX

(71) Applicant: PRATT & WHITNEY CANADA CORP., Longueuil (CA)

(72) Inventors: Tim Redford, Campbellville (CA); David H. Menheere, Norval (CA); Santo Chiappetta, Georgetown (CA); Daniel Van Den Ende, Mississauga (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 146 days.

(21) Appl. No.: 16/179,252

(22) Filed: Nov. 2, 2018

(65) Prior Publication Data

US 2020/0141326 A1 May 7, 2020

(51) Int. Cl.
| | |
|---|---|
| *F02C 7/36* | (2006.01) |
| *F02C 6/08* | (2006.01) |
| *F02C 7/32* | (2006.01) |
| *F02C 7/10* | (2006.01) |
| *F02C 3/06* | (2006.01) |

(52) U.S. Cl.
CPC ............... *F02C 7/36* (2013.01); *F02C 6/08* (2013.01); *F02C 7/10* (2013.01); *F02C 7/32* (2013.01); *F02C 3/06* (2013.01)

(58) Field of Classification Search
CPC ...... F02C 7/10; F02C 7/32; F02C 7/36; F02C 3/06; F05D 2220/50; F16H 3/62; F16H 3/666
See application file for complete search history.

(56) References Cited

U.S. PATENT DOCUMENTS

| | | | | | |
|---|---|---|---|---|---|
| 2,531,761 | A | * | 11/1950 | Zucrow | F02K 9/78 60/225 |
| 2,693,080 | A | * | 11/1954 | Hutchinson | F02C 9/28 60/39.281 |
| 3,171,252 | A | * | 3/1965 | Trowbridge | F02C 7/277 60/788 |
| 3,280,554 | A | * | 10/1966 | Knowles | F02C 7/36 60/39.163 |
| 3,632,222 | A | * | 1/1972 | Cronstedt | F01D 25/04 415/119 |
| 3,666,064 | A | * | 5/1972 | Bird | F16D 23/02 192/84.3 |
| 3,761,205 | A | * | 9/1973 | Cronstedt | F02C 3/113 417/407 |
| 3,952,613 | A | * | 4/1976 | Iijima | F16H 3/666 475/280 |
| 4,473,754 | A | * | 9/1984 | Joy | F02C 1/04 290/43 |

(Continued)

*Primary Examiner* — William H Rodriguez
(74) *Attorney, Agent, or Firm* — Norton Rose Fulbright Canada LLP

(57) ABSTRACT

A gas turbine engine system includes a boost compressor configured to compress air; a combustor in which the compressed air is mixed with fuel and ignited to generate a stream of combustion gases; and a turbine configured to extract energy from the combustion gases, the turbine being drivingly coupled to the boost compressor and to an output shaft via a differential gearbox configured to apportion an input torque from the turbine between a first output torque applied to the output shaft and a second output torque applied to the boost compressor.

10 Claims, 10 Drawing Sheets

(56) References Cited

U.S. PATENT DOCUMENTS

| | | | | |
|---|---|---|---|---|
| 4,503,666 A * | 3/1985 | Christoff | B64D 13/06 | 60/39.183 |
| 4,523,517 A * | 6/1985 | Cronin | B64D 13/06 | 237/2 A |
| 4,900,231 A * | 2/1990 | Kennedy | B64D 41/00 | 417/16 |
| 5,039,281 A * | 8/1991 | Johnston | F02C 7/32 | 417/212 |
| 5,136,837 A | 8/1992 | Davison | | |
| 5,152,668 A * | 10/1992 | Bulman | F01D 7/00 | 416/129 |
| 5,222,356 A * | 6/1993 | Evenson | F02C 7/057 | 415/26 |
| 5,235,801 A * | 8/1993 | Evenson | F02C 6/00 | 415/26 |
| 5,692,988 A * | 12/1997 | Beim | F16H 3/666 | 475/280 |
| 5,716,298 A * | 2/1998 | Beim | F16H 3/666 | 475/275 |
| 6,071,208 A * | 6/2000 | Koivunen | F16H 3/66 | 475/275 |
| 8,572,943 B1 * | 11/2013 | Sheridan | F02C 7/06 | 60/39.08 |
| 8,966,876 B2 * | 3/2015 | Suciu | F02C 9/16 | 184/6.11 |
| 2005/0137050 A1 * | 6/2005 | Winzeler | F16H 3/66 | 475/296 |
| 2007/0087892 A1 * | 4/2007 | Orlando | F02C 3/067 | 475/348 |
| 2007/0151258 A1 * | 7/2007 | Gaines | F02K 3/06 | 60/792 |
| 2007/0232436 A1 * | 10/2007 | Lepelletier | F16H 3/66 | 475/271 |
| 2008/0060341 A1 * | 3/2008 | Loisy | F02K 3/02 | 60/226.1 |
| 2008/0103012 A1 * | 5/2008 | Kim | F16H 3/666 | 475/275 |
| 2008/0120839 A1 * | 5/2008 | Schilling | F02C 7/36 | 29/888.02 |
| 2008/0138195 A1 * | 6/2008 | Kern | F02C 3/113 | 415/122.1 |
| 2009/0239699 A1 * | 9/2009 | Baldwin | F16H 3/66 | 475/276 |
| 2009/0288421 A1 * | 11/2009 | Zeiner | F02C 3/10 | 60/792 |
| 2013/0157796 A1 * | 6/2013 | Etchason | F16H 3/66 | 475/275 |
| 2013/0259654 A1 * | 10/2013 | Kupratis | F02C 7/36 | 415/122.1 |
| 2014/0208760 A1 * | 7/2014 | Dubreuil | F02C 7/36 | 60/772 |
| 2014/0260295 A1 * | 9/2014 | Ullyott | F02C 3/113 | 60/774 |
| 2014/0290265 A1 * | 10/2014 | Ullyott | F02C 3/113 | 60/773 |
| 2015/0080169 A1 * | 3/2015 | Schmid | F16H 3/62 | 475/317 |
| 2015/0275758 A1 * | 10/2015 | Foutch | F02C 7/36 | 60/779 |
| 2015/0275769 A1 * | 10/2015 | Foutch | F02C 9/18 | 60/776 |
| 2016/0177841 A1 * | 6/2016 | Blaney | F02C 7/36 | 475/344 |
| 2016/0369702 A1 * | 12/2016 | Otto | F16H 3/72 | |
| 2017/0174357 A1 | 6/2017 | Ramos-Paul Lastra et al. | | |
| 2018/0135512 A1 * | 5/2018 | Poulin | F02C 6/206 | |
| 2019/0309683 A1 * | 10/2019 | Mackin | B64D 33/02 | |
| 2019/0383220 A1 * | 12/2019 | Mackin | B64D 41/00 | |
| 2020/0095930 A1 | 3/2020 | Blumer et al. | | |
| 2020/0141327 A1 * | 5/2020 | Redford | F02C 7/32 | |
| 2020/0309031 A1 * | 10/2020 | Luck | F02C 7/36 | |
| 2020/0340406 A1 * | 10/2020 | Maljean | H02K 7/116 | |
| 2020/0400036 A1 * | 12/2020 | Redford | F01D 15/10 | |
| 2020/0400077 A1 * | 12/2020 | Redford | F02C 7/32 | |
| 2021/0017911 A1 * | 1/2021 | Spruce | F02C 7/36 | |

* cited by examiner

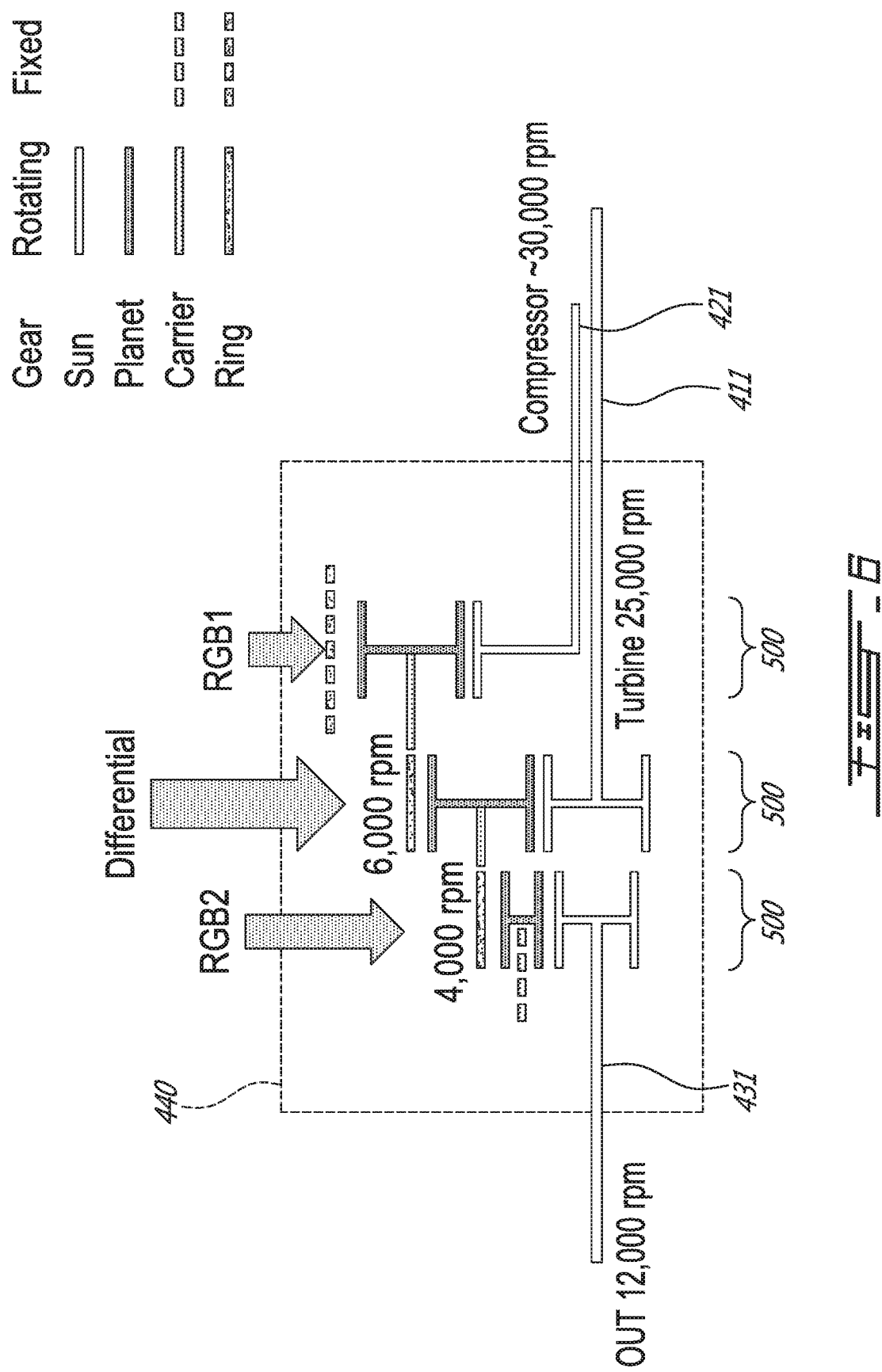

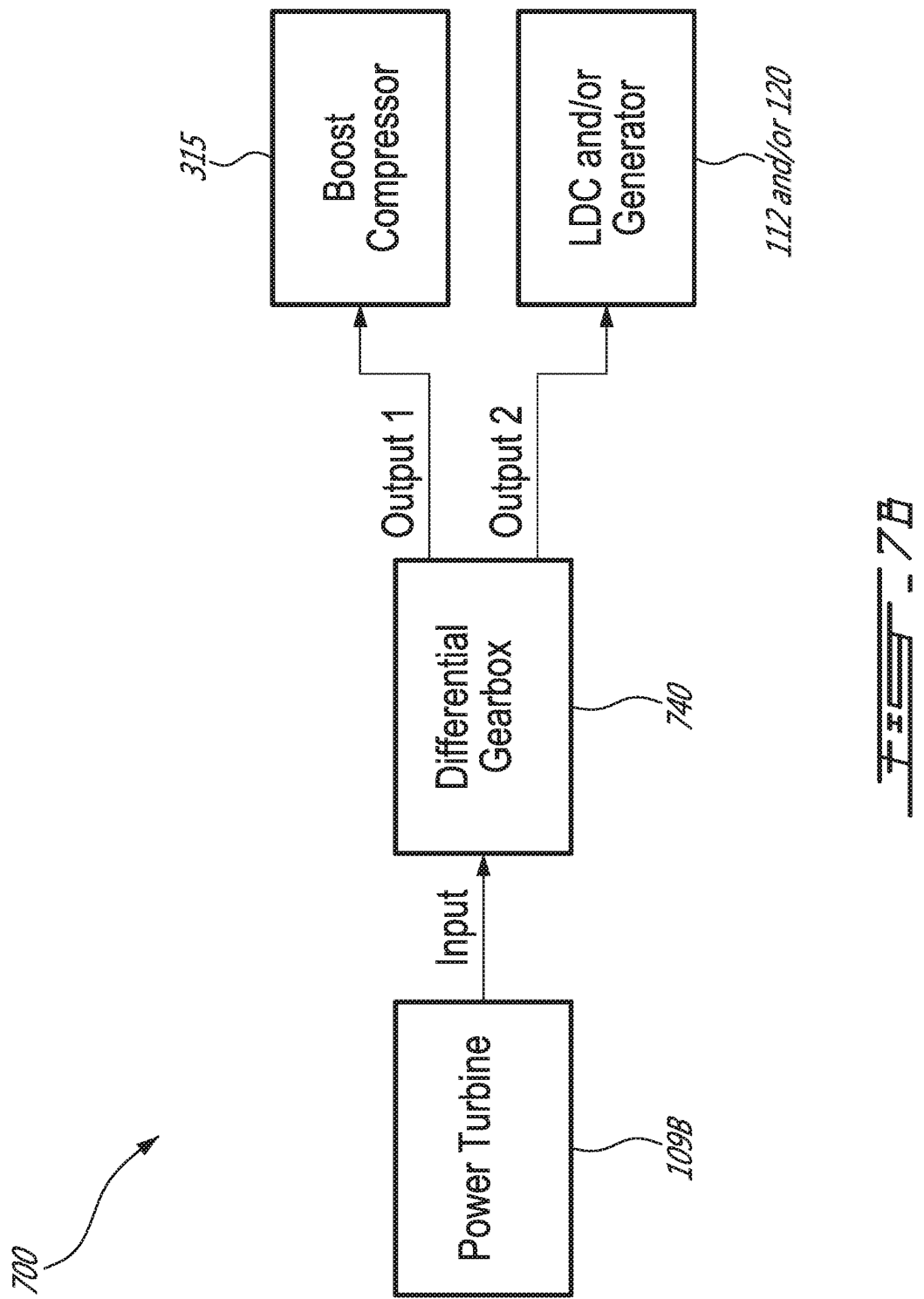

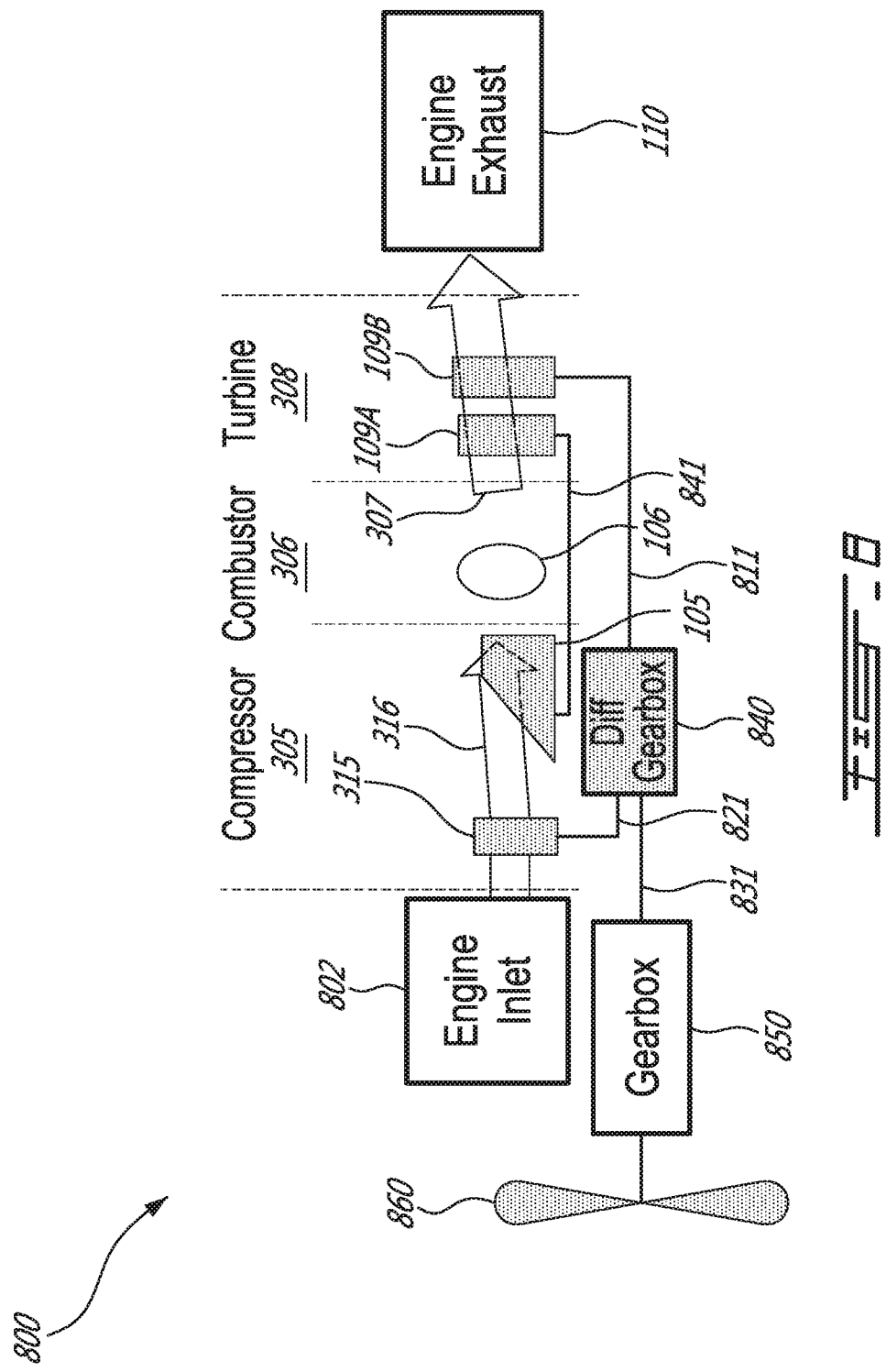

GAS TURBINE ENGINE WITH DIFFERENTIAL GEARBOX

FIELD

This relates to gas turbine engines and auxiliary power units.

BACKGROUND

In a conventional auxiliary power unit (APU) (or Auxiliary Power System (APS)) including a gas turbine engine, a load compressor (LDC) provides an air flow to an environmental control system (ECS). As the LDC may be mechanically linked to an electric generator that is also driven by the gas turbine engine, the components are constrained to a single speed. Therefore, the LDC may not stop rotating and the air flow generated by the LDC may never be reduced to zero. Unused air may be dumped into an exhaust stream, thereby wasting compressor work. Improvement is desirable.

SUMMARY

According to an aspect, there is provided an auxiliary power unit including: a load compressor configured to generate compressed air for an environmental control system of an aircraft; a gas turbine engine drivingly coupled to the load compressor; and a conduit establishing fluid communication between the load compressor and an injection location in a gas path of the gas turbine engine to direct at least some of the compressed air generated by the load compressor to the injection location, the injection location being upstream of a turbine of the gas turbine engine.

In some embodiments, a spool of the gas turbine engine is operatively coupled for common rotation with the load compressor.

In some embodiments, the injection location in the gas path is in a turbine section of the gas turbine engine.

In some embodiments, the injection location in the gas path is in a compressor section of the gas turbine engine.

In some embodiments, a spool of the gas turbine engine drives the load compressor and the load compressor rotates at a different speed from the spool.

In some embodiments, a differential gearbox is operatively coupled between the load compressor and the gas turbine engine.

In some embodiments, the injection location in the gas path is at a lower pressure than a pressure of the compressed air.

In some embodiments, an exhaust pathway establishes fluid communication between the load compressor and an exhaust of the gas turbine engine to direct at least some of the compressed air generated by the load compressor to the exhaust of the gas turbine engine.

In some embodiments, a recuperator is downstream of the gas turbine engine, and the conduit passes through the recuperator between the load compressor and the injection location.

In some embodiments, the recuperator is to provide heat exchange between exhaust of the gas turbine engine and at least some of the compressed air generated by the load compressor.

According to an aspect, there is provided a method of operating an auxiliary power unit of an aircraft, the method including: generating, by a load compressor drivingly coupled to a gas turbine engine, compressed air for an environmental control system of the aircraft; and directing at least some of the compressed air to an injection location in a gas path of the gas turbine engine, the injection location being upstream of a turbine of the gas turbine engine.

In some embodiments, the method further includes driving the load compressor with a spool of the gas turbine engine operatively coupled to the load compressor.

In some embodiments, the injection location in the gas path is in a turbine section of the gas turbine engine.

In some embodiments, the injection location in the gas path is in a compressor section of the gas turbine engine.

In some embodiments, the method further includes driving the load compressor with a spool of the gas turbine engine where the load compressor rotates at a different speed from the spool.

In some embodiments, the method further includes driving the load compressor with a spool of the gas turbine engine via a differential gearbox.

In some embodiments, the injection location in the gas path is at a lower pressure than a pressure of the compressed air.

In some embodiments, the method further includes directing at least some of the compressed air to an exhaust of the gas turbine engine.

In some embodiments, the method further includes performing a heat exchange between an exhaust of the gas turbine engine and the at least some of the compressed air, prior to directing the at least some of the compressed air to the injection location.

In some embodiments, the method further includes directing the at least some of the compressed air to a recuperator to perform the heat exchange.

According to another aspect, there is provided a gas turbine engine system, including: a boost compressor configured to compress air; a combustor in which the compressed air is mixed with fuel and ignited to generate a stream of combustion gases; and a turbine configured to extract energy from the combustion gases, the turbine being drivingly coupled to the boost compressor and to an output shaft via a differential gearbox configured to apportion an input torque from the turbine between a first output torque applied to the output shaft and a second output torque applied to the boost compressor.

In some embodiments, the first output torque is different from the second output torque.

In some embodiments, a rotational speed ratio between the output shaft and the turbine is different from a rotational speed ratio between the boost compressor and the turbine.

In some embodiments, the output shaft is drivingly coupled to a load compressor configured to generate compressed air for an environmental control system of an aircraft.

In some embodiments, the output shaft is also drivingly coupled to an electric generator.

In some embodiments, the output shaft is drivingly coupled to an electric generator.

In some embodiments, the gas turbine engine system further includes: a load compressor drivingly coupled to the output shaft and configured to generate compressed air for an environmental control system of an aircraft; and a conduit establishing fluid communication between the load compressor and an injection location in a gas path of the gas turbine engine to direct at least some of the compressed air generated by the load compressor to the injection location, the injection location being upstream of the turbine of the gas turbine engine.

In some embodiments, the gas turbine engine system further includes: a recuperator downstream of the gas turbine engine to provide heat exchange between exhaust of the gas turbine engine and at least some of the compressed air generated by the load compressor, and the conduit passes through the recuperator between the load compressor and the injection location.

In some embodiments, the output shaft is drivingly coupled to a propeller via a reduction gearbox.

In some embodiments, the differential gearbox includes an epicyclic gear set.

In some embodiments, the boost compressor is drivingly coupled to the differential gearbox via a first reduction gearbox.

In some embodiments, the output shaft is drivingly coupled to the differential gearbox via a second reduction gearbox.

In some embodiments, the differential gearbox includes a compound epicyclic gear set.

In some embodiments, the differential gearbox includes a first epicyclic gear set having a first sun gear rotatable about a first axis, a first ring gear rotatable about the first axis, one or more first planet gears, and a first carrier rotatable about the first axis; and the gas turbine engine system further includes: a second epicyclic gear set having a second sun gear rotatable about a second axis, a second ring gear rotatable about the second axis, one or more second planet gears, and a second carrier rotatable about the second axis; and a third epicyclic gear set having a third sun gear rotatable about a third axis, a third ring gear rotatable about the third axis, one or more third planet gears, and a third carrier rotatable about the third axis; and: the first sun gear is drivingly coupled to the boost compressor, the first ring gear is fixed, the first carrier ring is drivingly coupled to the second ring gear, the second sun gear is drivingly coupled to the turbine, the second carrier is drivingly coupled to the third ring gear, the third sun gear is drivingly coupled to the output shaft, and the third carrier ring is fixed.

According to another aspect, there is provided a method of operating a gas turbine engine, including: using a boost compressor to compress air; generating a stream of combustion gases by igniting the compressed air mixed with fuel; and extracting energy from the combustion gases with a turbine; and using a differential gearbox to apportion an input torque from the turbine between a first output torque applied to an output shaft and a second output torque applied to the boost compressor.

In some embodiments, the second output torque delivered to the boost compressor is different from the first output torque delivered to the output shaft.

In some embodiments, a torque split between the second output torque delivered to the boost compressor and the first output torque delivered to the output shaft is a constant ratio determined by a gear ratio of the differential gearbox.

In some embodiments, the gear ratio of the differential gearbox is the gear ratio between a sun gear and a ring gear of an epicyclic differential gear in the differential gearbox.

In some embodiments, the method further includes driving a propeller via the output shaft.

In some embodiments, the method further includes driving a load compressor via the output shaft.

In some embodiments, the method further includes driving a generator via the output shaft.

In some embodiments, the method further includes driving a load compressor and a generator via the output shaft.

In some embodiments, the method further includes directing at least some compressed air generated by the load compressor to an injection location in a gas path of the gas turbine engine, the injection location being upstream of the turbine.

In some embodiments, the method further includes performing a heat exchange between an exhaust of the gas turbine engine and the at least some of the compressed air, prior to directing the at least some of the compressed air to the injection location.

In some embodiments, the method further includes directing the at least some of the compressed air to a recuperator to perform the heat exchange.

In some embodiments, the method further includes directing at least some compressed air generated by the load compressor to an injection location in a gas path of the gas turbine engine, the injection location being in a turbine section of the gas turbine.

In some embodiments, the method further includes directing at least some compressed air generated by the load compressor to an injection location in a gas path of the gas turbine engine, the injection location being in a compressor section of the gas turbine.

Other features will become apparent from the drawings in conjunction with the following description.

BRIEF DESCRIPTION OF DRAWINGS

In the figures which illustrate example embodiments,

FIG. 6 is a schematic diagram of a differential gearbox, in accordance with an embodiment;

FIG. 7B is a schematic diagram of an operating environment of the differential gearbox of the auxiliary power unit of FIG. 7A, in accordance with an embodiment;

FIG. 8 is a schematic cross-section view of a turboprop engine, in accordance with an embodiment.

DETAILED DESCRIPTION

Figure 1:
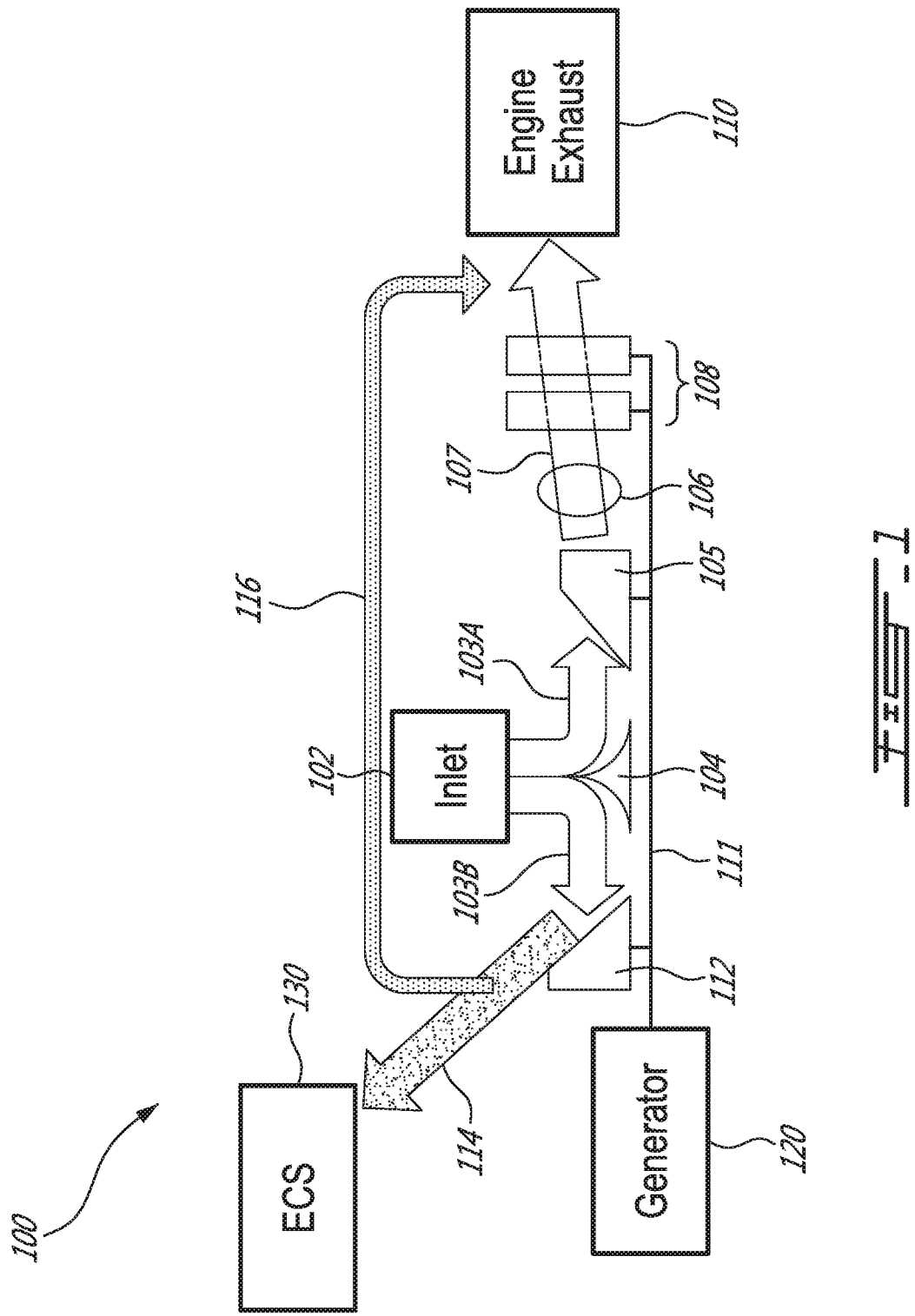
FIG. 1 is a schematic cross-section view of an auxiliary power unit.

FIG. 1 illustrates an auxiliary power unit (APU) 100 (sometimes called "auxiliary power system") including a gas turbine engine for use on an aircraft to supply electric and pneumatic power to the aircraft systems as an auxiliary or secondary source of power. Any other suitable engine may be employed.

As shown in FIG. 1, APU 100 includes an inlet 102 through which ambient air is drawn, a flow splitter 104 for splitting the inlet air into a engine stream air 103A and a load stream air 103B, a high pressure compressor (HPC) 105 for pressurizing the engine stream air 103A, a combustor 106 in which the compressed engine stream air 103A is mixed with fuel and ignited for generating an annular combustion stream 107 of hot combustion gases, and a turbine section 108 having turbines, for example, a two-stage turbine as shown in FIG. 1 or other multi-stage turbine, for extracting energy from the combustion gases which then exhaust to engine exhaust 110. The HPC 105, combustor 106 and turbine section 108 form part of the gas turbine engine portion of the APU 100. The gas turbine engine defines a gas path through which gases flow, such as engine stream air 103A and combustion stream 107, to drive the engine. A power shaft 111 is connected to one or more turbines of turbine section 108 and HPC 105. Power shaft 111 is driven by the one or more turbines of turbine section 108.

APU 100 further includes a load compressor (LDC) 112 for pressurizing the load stream air 103B to generate load compressor air 114 for use by an environment control system (ECS) 130 of an aircraft in which APU 100 is installed. In some embodiments, for example, as shown in FIG. 1, LDC 112 may be linked mechanically to HPC 105 and turbine section 108 of the gas turbine engine by way of power shaft 111, and thus LDC 112 may be drivingly coupled to the gas turbine engine. APU 100 may also include a bypass excess air pathway or conduit establishing fluid communication between LDC 112 and the engine exhaust for directing at least some of excess load compressor air 116 to, in an example, an exhaust pathway to engine exhaust 110. Alternatively or in addition as explained below, the excess load compressor air 116 may be directed to another location upstream of one or more turbines of turbine section 108 in order to permit energy from the excess load compressor air 116 to be converted into useful work by the gas turbine engine of APU 100.

ECS 130 may provide air supply, thermal control, and cabin pressurization in the aircraft.

APU 100 may also be adapted to supply electric power to aircraft systems by way of a generator 120. Generator 120 may by an oil-cooled generator and include a gearbox for transferring power from power shaft 111 of APU 100 to electric power. In an example, generator 120 may operate at a constant speed of approximately 12,000 rpm (revolutions per minute), plus or minus 500 rpm.

In use, inlet 102 draws air into APU 100, and flow splitter 104 splits the inlet air into engine stream air 103A and load stream air 103B.

Engine stream air 103A is directed to HPC 105. HPC 105 pressurizes the air by rotating. In combustor 106, the compressed engine stream air 103A is mixed with fuel and ignited, generating combustion stream 107 of hot combustion gases. Propulsion of combustion stream 107 through turbine section 108 rotates the turbines of turbine section 108, thus extracting energy from the combustion gases, and rotating power shaft 111 that is drivingly coupled to one or more turbines in turbine section 108. Combustion stream 107 then exits APU 100 as engine exhaust 110.

Load stream air 103B is directed to LDC 112. In embodiments in which LDC 112 is linked mechanically to HPC 105 and turbine section 108, for example, by way of power shaft 111, rotation of power shaft 111 drives the rotation of LDC 112.

The rotation of LDC 112 compresses air within LDC 112, generating compressed load compressor air 114. The compressed load compressor air 114 may then be directed to ECS 130 of the aircraft. As such, APU 100 is adapted to supply load compressor air 114 for pneumatic power to ECS 130.

Load compressor air 114 generated by LDC 112 may be regulated by inlet guide vanes and bleed valves (not shown). However, since the rotation of LDC 112 is mechanically linked to HPC 105, as HPC 105 rotates, so does LDC 112. In some embodiments, LDC 112 and HPC 105 rotate at the same speed. In some embodiments, LDC 112 and HPC 105 rotate at different speeds.

Thus, in embodiments in which LDC 112 is mechanically linked to HPC 105, any time HPC 105 rotates LDC 112 will generate load compressor air 114. As shown in FIG. 1, if more load compressor air 114 is generated by LDC 112 than is required by ECS 130, unused excess load compressor air 116 may be released by a bleed valve (not shown) and directed along an exhaust pathway to be injected into engine exhaust 110. As such, compressor work (generated by HPC 105 and LDC 112) may be wasted.

Rotation of power shaft 111 may also transfer power to the gearbox of generator 120 for electric power.

The sizing of APU 100 may be determined by the requirements at the highest commanded generator 120 power and/or ECS 130 pneumatic power, leaving APU 100 running below its maximum power at other points of the operating envelope.

Figure 2:
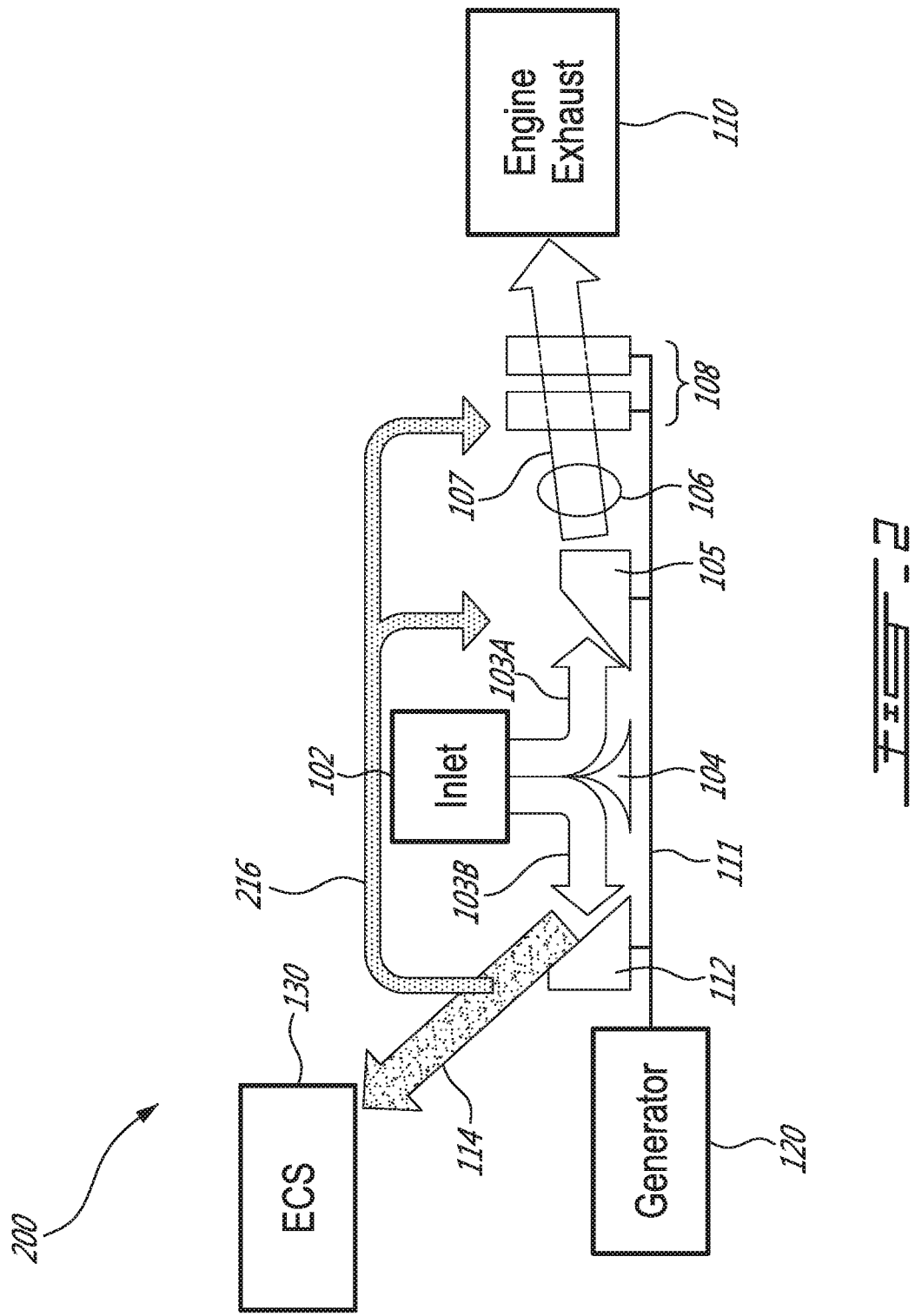
FIG. 2 is a schematic cross-section view of an auxiliary power unit in which excess load compressor air is directed to a gas path of a gas turbine engine, in accordance with an embodiment.

FIG. 2 illustrates an auxiliary power unit (APU) 200 including a gas turbine engine for use on an aircraft to supply electric and pneumatic power to the aircraft systems as an auxiliary or secondary source of power, in which excess load compressor air is directed to HPC 105 and turbine section 108. Any other suitable engine may be employed.

As shown in FIG. 2, APU 200 includes some of the same structure and components as the architecture of APU 100, including inlet 102, flow splitter 104, engine stream air 103A, load stream air 103B, compressor 105, combustor 106, combustion stream 107, turbine section 108, engine exhaust 110, power shaft 111, LDC 112, load compressor air 114, generator 120 and ECS 130, as described herein.

HPC 105, combustor 106 and turbine section 108 form part of the gas turbine engine portion of the APU 200. The gas turbine engine defines a gas path through which gases, such as engine stream air 103A and combustion stream 107 flow.

APU 200 may also include a bypass excess air pathway or conduit establishing fluid communication between LDC 112 and the gas path of the gas turbine engine, in combination with a controller and one or more bypass valves for controlling and directing the flow of excess load compressor air 216 generated by LDC 112. In some embodiments, APU 200 may also include a bypass excess air pathway or conduit establishing fluid communication between LDC 112 and the engine exhaust for directing at least some of excess load compressor air 216 to, in an example, an exhaust pathway to engine exhaust 110.

In use, in embodiments in which LDC 112 of APU 200 is mechanically linked to HPC 105, any time HPC 105 rotates LDC 112 will generate load compressor air 114.

As shown in FIG. 2, if more load compressor air 114 is generated by LDC 112 than is required by ECS 130, unused excess load compressor air 216 may be released by a bleed valve (not shown) and directed to be injected into the gas path of the gas turbine engine upstream of a turbine of the gas turbine engine, for example, in HPC 105.

As also shown in FIG. 2, excess load compressor air 216 may be directed along an excess air pathway to be injected, for example, adjacent one or more turbines in turbine section 108. Injection of excess load compressor air 216 into turbine section 108 may assist in the rotation of one or more turbines of turbine section 108 and permit energy from the excess load compressor air 216 to be converted into useful work by turbine section 108.

In some embodiments, excess load compressor air 216 may be directed along an excess air pathway to be injected at combustor 106 and/or any of the stages of compression upstage of combustor 106. In some embodiments, at least some of excess load compressor air 216 may be directed along an exhaust pathway to be injected into engine exhaust 110.

Excess load compressor air 216 may be directed along an excess air pathway to be injected at an area of lower pressure than load compressor air 114 within APU 200. Thus, backflow of excess load compressor air 216 may be avoided.

In some embodiments, a detector may detect the load/demand for load compressor air 114 required by ECS 130, and used to redirect load compressor air 114 and excess load compressor air 216 as needed.

In some embodiments, redirection of excess load compressor air 216 may be retrofitted on an existing gas turbine engine or APU.

Conveniently, redirecting excess load compressor air 216 into the gas path of the turbine of APU 200 (e.g., at one or more locations such as turbine section 108, combustor 106 and HPC 105) may take advantage of the work applied to load compressor air 114 and may improve the overall performance of APU 200.

Figure 3:
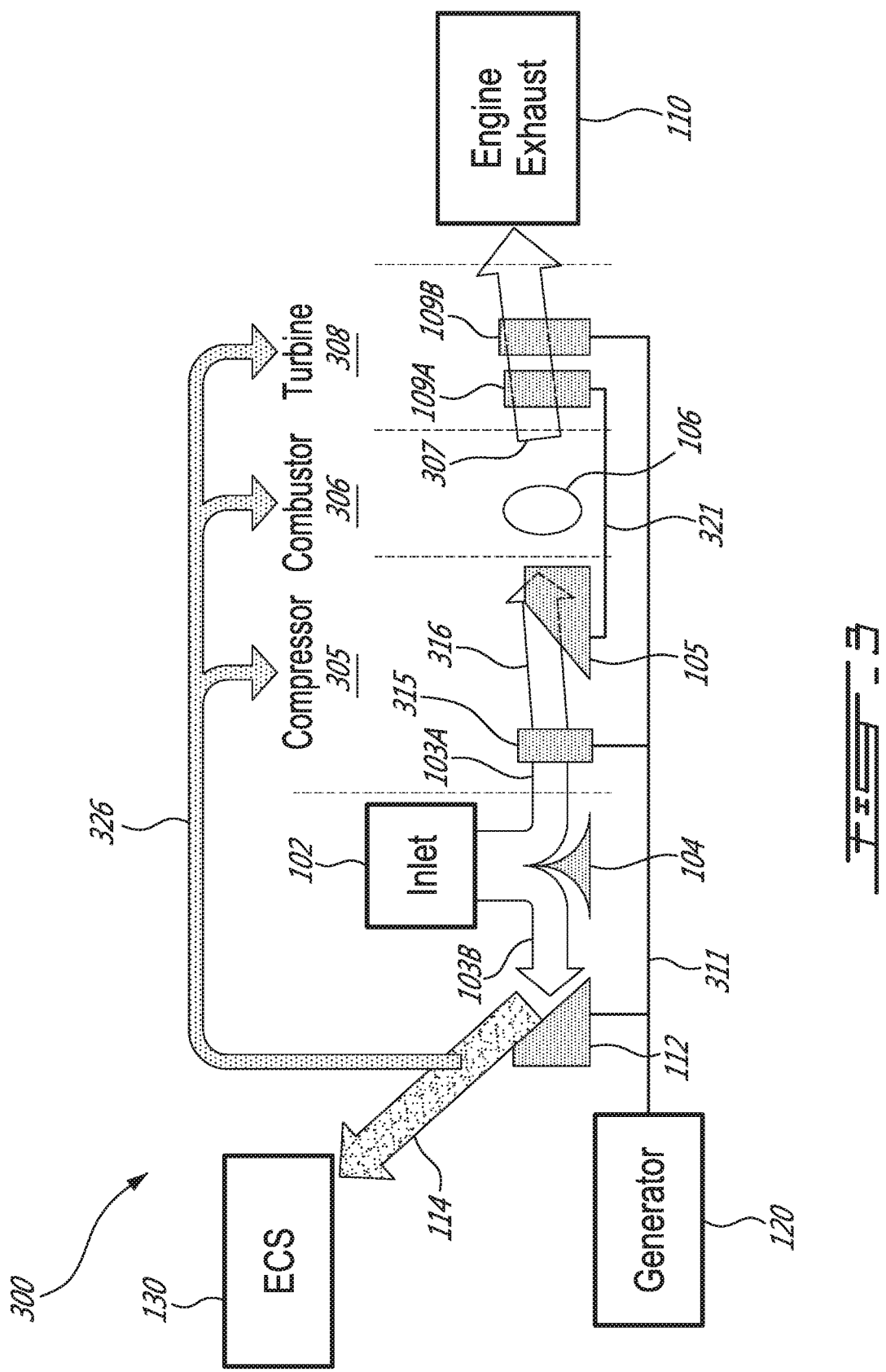
FIG. 3 is a schematic cross-section view of an auxiliary power unit including a boost compressor and in which a high-pressure shaft of an engine core is separately rotatable from a power shaft in accordance with an embodiment.

FIG. 3 illustrates an auxiliary power unit (APU) 300 including a gas turbine engine for use on an aircraft to supply electric and pneumatic power to the aircraft systems as an auxiliary or secondary source of power, in which a spool of the engine core of the gas turbine engine, including HPC 105, combustor section 306 and high-pressure turbine (s) 109A, is separately rotatable from the power shaft 311, with additional compressor(s) added. Any other suitable engine may be employed.

As shown in FIG. 3, APU 300 includes some of the same structure and components as the architecture of APU 100, including inlet 102, flow splitter 104, engine stream air 103A, load stream air 103B, HPC 105, engine exhaust 110, load compressor 112, load compressor air 114, generator 120 and ECS 130, as described herein.

As shown in FIG. 3, APU 300 includes a compressor section 305 for pressurizing the engine stream air 103A, in which engine stream air 103A is compressed by boost compressor 315 to form boosted compressor stream 316 which is then further compressed by HPC 105 to form further compressed air, a combustor section 306 in which the further compressed air is mixed with fuel and ignited for generating an annular combustion stream 307 of hot combustion gases, and a turbine section 308 having high-pressure turbine 109A and power turbine 109B for extracting energy from the combustion gases which then exhaust to engine exhaust 110.

Compressor section 305, combustor section 306 and turbine section 308 form part of the gas turbine engine portion of APU 300. The gas turbine engine defines a gas path through which gases flow, such as engine stream air 103A, boosted compressor stream 316 and combustion stream 307.

Compressor section 305 includes a boost compressor 315, for pressurizing engine stream air 103A to generate a boosted compressor stream 316, or compressed air, directed toward HPC 105 for further compression to form further compressed air. Boost compressor 315 may have variable geometry inlet guide vanes and/or handling bleed valves to manage its surge margins. Accordingly, boost compressor 315 may be disposed upstream of HPC 105. In some embodiments, boost compressor 315 may be separately rotatable from high-pressure shaft 321 and consequently also separately rotatable from HPC 105.

In some embodiments, combustor section 306 includes combustor 106, as described herein. In some embodiments, combustion stream 307 may be combustion stream 107, as described herein.

In some embodiments, turbine section 308 includes one or more turbines connected to HPC 105 by way of a high-pressure shaft 321, referred to herein as "high-pressure turbine 109A", and one or more turbines connected to LDC 112 by way of a power shaft 311, referred to herein as "power turbine 109B". In some embodiments, turbine section 308 may be generally similar to turbine section 108, as described herein.

As shown in FIG. 3, in some embodiments, LDC 112 may be linked mechanically to boost compressor 315 and power turbine 109B by way of a power shaft 311. In some embodiments, HPC 105 and high-pressure turbine 109A may be mechanically linked together by way of a high-pressure shaft 321.

In some embodiments, high-pressure shaft 321 may be separate and independent from power shaft 311. This may reduce a need for inlet guide vanes and bleed valves for boost compressor 315. Furthermore, high-pressure shaft 321 may not be constrained to a fixed input speed of generator 120.

FIG. 3 illustrates an example of an APU having a dual-spool configuration. For example, the gas turbine engine may include a high-pressure spool including high-pressure shaft 321, one or more stages of multistage compressor section 305 such as HPC 105, and one or more turbines of turbine section 308 such as high-pressure turbine 109A. The gas turbine engine may also include a low-pressure spool including low-pressure power shaft 311 including one or more stages of multistage compressor section 305 such as boost compressor 315 and one or more turbines of turbine section 308 such as power turbine 109B. It is understood that the gas turbine engine of APU 300 may not be limited to such a dual-spool configuration.

In some embodiments, APU 300 may also include a bypass excess air pathway or conduit establishing fluid communication between LDC 112 and the gas path of the gas turbine engine, in combination with a controller and one or more bypass valves for controlling and directing the flow of excess load compressor air 326 generated by LDC 112 (for example, excess load compressor air not required by ECS 130).

Excess load compressor air 326 may be directed along an excess air pathway to be injected into the gas path of the gas turbine engine upstream of a turbine of the gas turbine engine, for example, adjacent one or more of high-pressure turbine 109A and power turbine 109B in turbine section 308. Injection of excess load compressor air 326 into turbine section 308 may assist in the rotation of one or more of high-pressure turbine 109A and power turbine 109B of turbine section 308. In some embodiments, excess load compressor air 326 may be injected upstream of power turbine 1098 and downstream of high-pressure turbine 109A, which may constitute a location with lower pressure than upstream of high-pressure turbine 109A.

In some embodiments, excess load compressor air 326 may be directed along an excess air pathway to be injected at combustor section 306 and/or any of the stages of compression upstage of combustor section 306.

Excess load compressor air 326 may be directed along an excess air pathway to be injected at an area of lower pressure than load compressor air 114 within APU 300, for example, upstream of power turbine 1098 and downstream of high-pressure turbine 109A, as discussed above. Thus, backflow of excess load compressor air 326 may be avoided.

In some embodiments, a detector may detect the load of load compressor air 114 required by ECS 130, and used to redirect load compressor air 114 and excess load compressor air 326 as needed.

Conveniently, redirecting excess load compressor air 326 into the gas path or power generation sections of APU 300 (such as compressor section 305, combustor section 306 and turbine section 308) may take advantage of the work applied to load compressor air 114 and may improve the overall performance of APU 300.

Conveniently, the configuration of APU 300 may offer improved performance over the range of an APU operating envelope.

Additional engine components of APU 300 may add weight, expense and complexity and consideration to the design of an APU. Unlinking components from a single shaft (and single speed constraint), such as components LDC 112, boost compressor 315, power turbine 1098 unlinked from components HPC 105 and high-pressure turbine 109A as shown in FIG. 3, may allow components to operate within an efficient region of their operating range, while continuing to maintain a fixed speed for generator 120 input.

Figure 4:
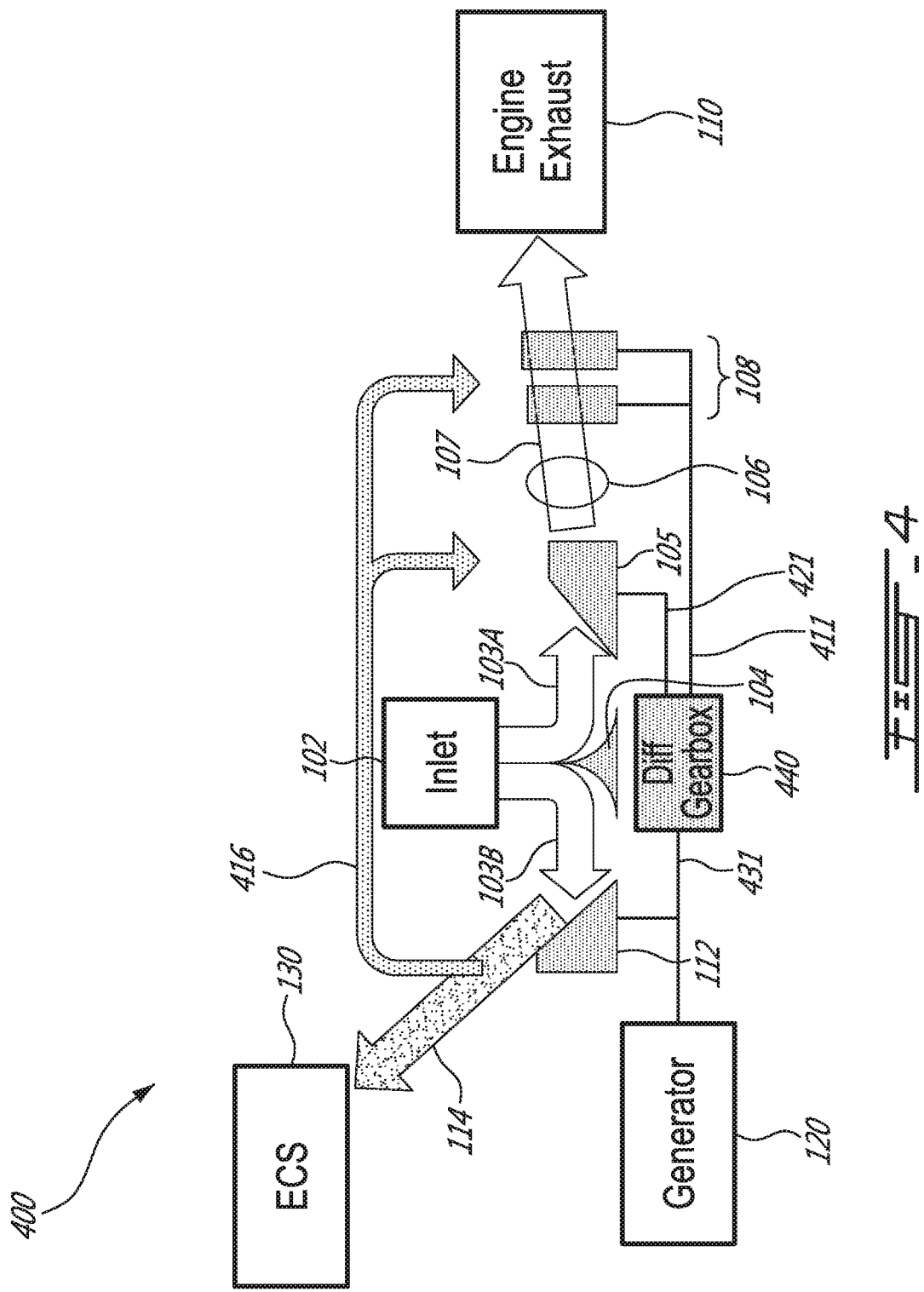
FIG. 4 is a schematic cross-section view of an auxiliary power unit in which components are connected through a differential gearbox, in accordance with an embodiment.

FIG. 4 illustrates an auxiliary power unit (APU) 400 including a gas turbine engine for use on an aircraft to supply electric and pneumatic power to the aircraft systems as an auxiliary or secondary source of power, in which components are connected through a differential gearbox. The differential gearbox can be configured to apportion an input torque between a first output torque and a second output torque.

Any other suitable engine may be employed.

As shown in FIG. 4, APU 400 includes some of the same structure and components as the architecture of APU 100, including inlet 102, flow splitter 104, engine stream air 103A, load stream air 103B, HPC 105, combustor 106, combustion stream 107, turbine section 108, engine exhaust 110, LDC 112, load compressor air 114, generator 120 and ECS 130, as described herein.

HPC 105, combustor 106 and turbine section 108 form part of the gas turbine engine portion of APU 400. The gas turbine engine defines a gas path through which gases flow, such as engine stream air 103A and combustion stream 107.

In place of a power shaft 111, APU 400 may include a turbine shaft 411, a compressor shaft 421 and a load shaft 431. Turbine shaft 411 connects to one or more turbines of turbine section 108. Compressor shaft 421 connects to HPC 105. Load shaft 431 connects to LDC 112 and generator 120.

Turbine shaft 411, compressor shaft 421 and load shaft 431 are connected to a differential gearbox 440. Differential gearbox 440 may have one input shaft and two output shafts, each of which may be connected through a reduction gear set. In some embodiments, turbine shaft 411 may provide rotational input or torque to differential gearbox 440, and compressor shaft 421 and load shaft 431 may receive rotational output or torque from differential gearbox 440.

In some embodiments, differential gearbox 440 may include a compound epicyclic gear set. Differential gearbox 440 may contain one or more interconnected epicyclic (differential) gears, for example, epicyclic planetary gear set 500. Differential gearbox 440 may comprise three interconnected shafts, as described in further detail below. In some embodiments, differential gearbox 440 may be a fixed speed gearbox. In some embodiments, differential gearbox 440 may be a variable speed gearbox.

In some embodiments, APU 400 may also include a bypass excess air pathway or conduit establishing fluid communication between LDC 112 and the gas path of the gas turbine engine, in combination with a controller and one or more bypass valves for controlling and directing the flow of excess load compressor air 416 generated by LDC 112 (for example, excess load compressor air not required by ECS 130).

Excess load compressor air 416 may be directed along an excess air pathway to be injected into the gas path of the gas turbine engine upstream of a turbine of the gas turbine engine, for example, adjacent one or more turbines of turbine section 108. Injection of excess load compressor air 416 may assist in the rotation of one or more turbines of turbine section 108.

In some embodiments, excess load compressor air 416 may be directed along an excess air pathway to be injected at combustor 106 and/or any of the stages of compression upstream of combustor 106.

Excess load compressor air 416 may be directed along an excess air pathway to be injected at an area of lower pressure than load compressor air 114 within the engine portion of APU 400. Thus, backflow of excess load compressor air 416 may be avoided.

In some embodiments, a detector may detect the load of load compressor air 114 required by ECS 130, and used to redirect load compressor air 114 and excess load compressor air 416 as needed.

Conveniently, redirecting excess load compressor air 416 into the power generation sections of APU 400 (such as HPC 105, combustor 106 and turbine section 108) may take advantage of the work applied to load compressor air 114 and may improve the overall performance of APU 400.

Figure 5B:
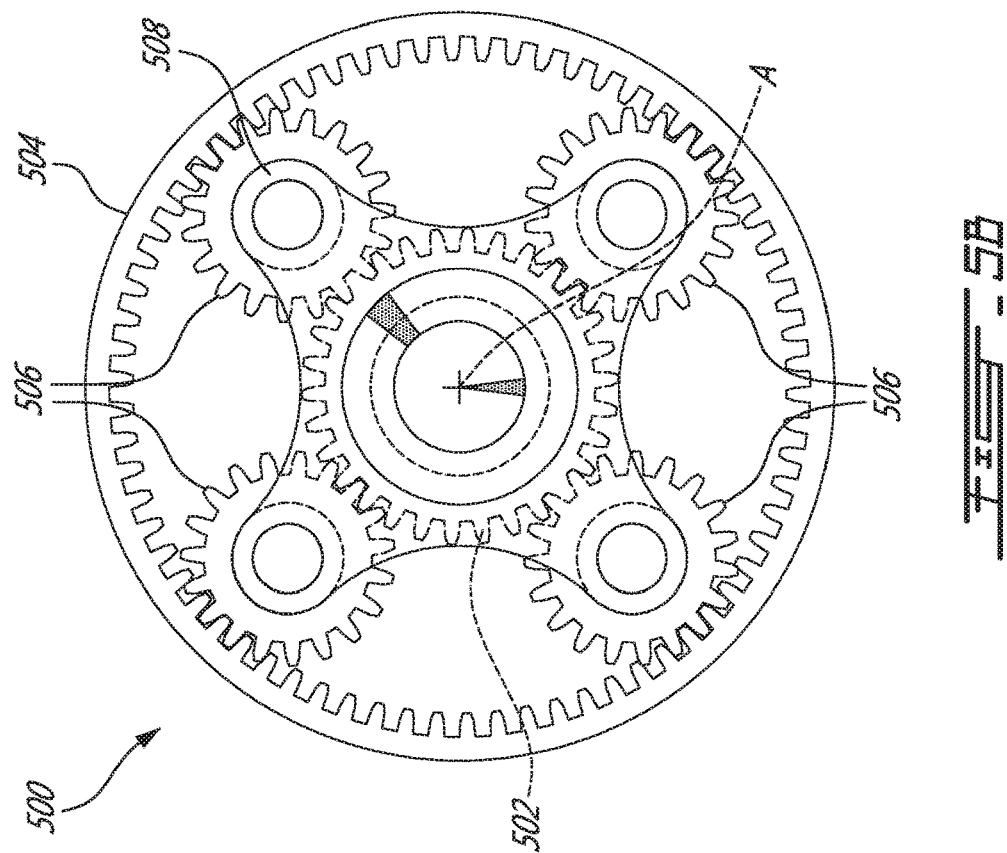
FIG. 5B is a schematic diagram of the epicyclic (differential) gear set of FIG. 5A in a second position.
Figure 5A:
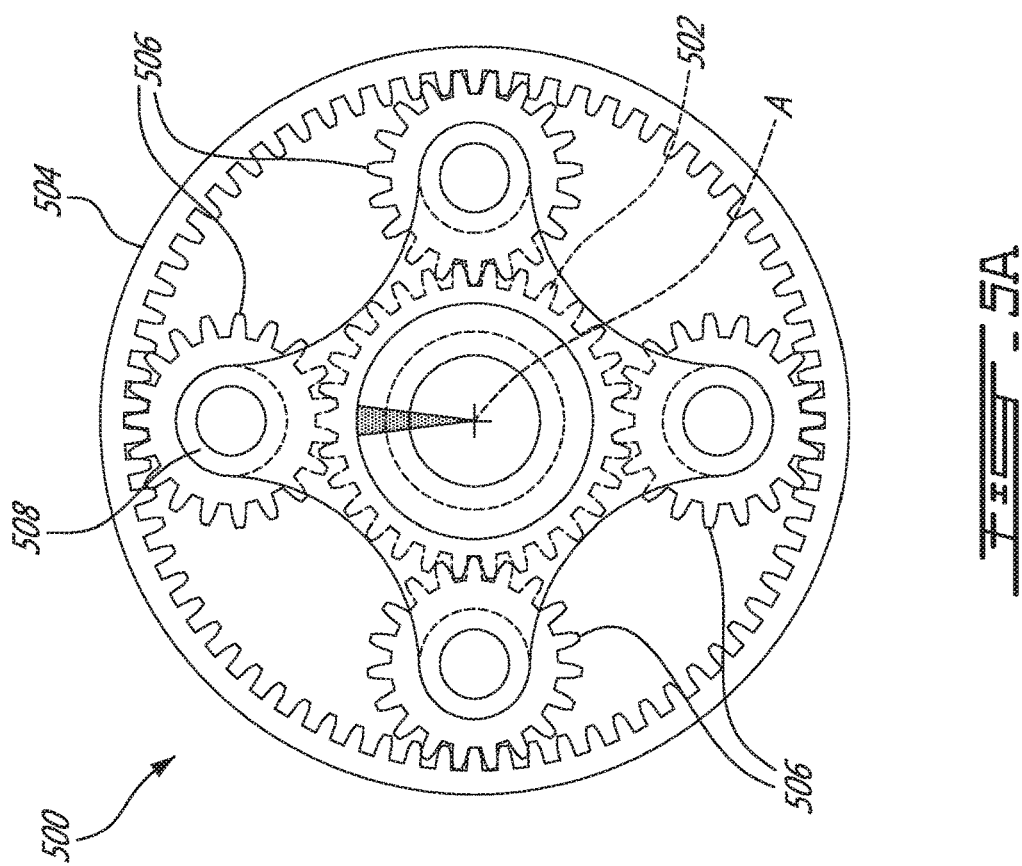
FIG. 5A is a schematic diagram of an epicyclic (differential) gear set in a first position, in accordance with an embodiment.

FIG. 5A is a schematic of a planetary gear set 500 of differential gearbox 440 of APU 400 in a first position, in accordance with an embodiment. FIG. 5B is a schematic of planetary gear set 500 of FIG. 5A in a second position.

Planetary gear set 500 includes four components: a sun gear 502 located in the center, a ring gear 504 that is the outer annulus gear, planet gears 506 connecting the outside of sun gear 502 to the inside of ring gear 504, and a carrier 508 that connects planet gears 506 at their centers of rotation. Sun gear 502, ring gear 504 and carrier 508 all rotate about center of axis A of planetary gear set 500.

In the second position illustrated in FIG. 5B, carrier 508 is rotated 45 degrees clockwise and ring gear 504 is held fixed as compared to the first position illustrated in FIG. 5A.

In some embodiments, differential gearbox 440 may include three planetary gear sets 500, interconnected as shown schematically in FIG. 6. Turbine shaft 411 may be connected to a sun gear 502 of a first planetary gear set 500 (labeled "Differential" in FIG. 6), compressor shaft 421 may be connected to a sun gear 502 of a second planetary gear set 500 (labeled "RGB1" in FIG. 6), and load shaft 431 may be connected to a sun gear 502 of a third planetary gear set 500

(labeled "RGB2" in FIG. 6). In some embodiments, compressor shaft 421 may be connected to a ring gear 504 of a second planetary gear set 500 or a carrier 508 of a second planetary gear set 500, depending on the speed of the component(s) driven by compressor shaft 421. In some embodiments, load shaft 431 may be connected to a ring gear 504 of a third planetary gear set 500 or a carrier 508 of a third planetary gear set 500, depending on the speed of the component(s) driven by load shaft 431. "RGB1" and "RGB2" may operate as a reduction gear set. Reduction gears such as "RGB1" and "RGB2" may be fixed and may be used to scale up or down the rotational speed (revolutions per minute) that are output from the "Differential" gear set. In some embodiments, reduction gear sets or gearboxes may or may not be integral with "Differential" or disposed within differential gearbox 440, or may be disposed in a separate location from the differential gear set or differential gearbox. In some embodiments, reduction gear sets or gearboxes may or may not be present. Reduction gear sets may or may not be planetary gear sets.

FIG. 6 illustrates the interconnection between carrier 508 of "RGB1" and ring gear 504 of "Differential", and the interconnection between carrier 508 of "Differential" and ring gear 504 of "RGB2". As noted in FIG. 6, ring gear 504 of "RGB1" and carrier 508 of "RGB2" are fixed. The remaining components rotate.

In an example as shown in FIG. 6, with appropriate gear ratios, one or more turbines of turbine section 108 may rotate turbine shaft 411 and sun gear 502 of "Differential" at 25,000 rpm, rotating ring gear 504 of "Differential" at 6,000 rpm, and thus rotating carrier 508 of "RGB1" at 6,000 rpm. Carrier 508 of "Differential" rotates at 4,000 rpm, thus rotating ring gear 504 of "RGB2" at 4,000 rpm. Reduction gear "RGB1" thereby rotates its sun gear 502 and thus compressor shaft 421 at 30,000 rpm, and reduction gear "RBG2" thereby rotates its sun gear 502 and thus load shaft 431 at 12,000 rpm. These speeds are provided for reference, and may not specifically refer to a particular design. Other suitable speed ranges may be contemplated.

Differential gearbox 440 may thus split power and torque between shafts (for example, turbine shaft 411, compressor shaft 421 and load shaft 431). Unlike a standard gear set that transfers power and reduces torque in a linear fashion, differential gearbox 440 may split power between shafts (for example, turbine shaft 411, compressor shaft 421 and load shaft 431) based on speed and gear ratio of sun gear(s) 502 and ring gear(s) 504 of gears 500 in differential gearbox 440. Differential gearbox 440 may thus split torque between output shafts at a constant ratio that may be determined by a gear ratio such as the ratio of the sun gear to the ring gear, for example, in the "Differential" gear of FIG. 6. In some embodiments, turbine shaft 411, compressor shaft 421 and load shaft 431 may be interchanged between the gears described herein, depending on power split requirements. In an example, load shaft 431 may not run off carrier 508 of "Differential", and compressor shaft 421 may not run off ring gear 504 of "Differential".

APU 400 may thus be able to maintain a constant output shaft speed on load shaft 431 (in an example, 12,000 rpm), while increasing or decreasing compressor shaft 421 and turbine shaft 411 speeds as output power increases or decreases. Allowing compressor shaft 421 and turbine shaft 411 speeds to vary may allow each component to operate at a more effective region of its operating range, and may make APU 400 more efficient.

In some embodiments, differential gearbox 440 may include as few as one planetary (the "differential") with standard reduction gears on from one to three input/output shafts. In some embodiments, differential gearbox 440 may include as many as three additional epicyclic gear sets (four total) with or without additional RGBs. In some embodiments, differential gearbox 440 may include any other suitable combination of epicyclic and reduction gear sets.

Figure 7A:
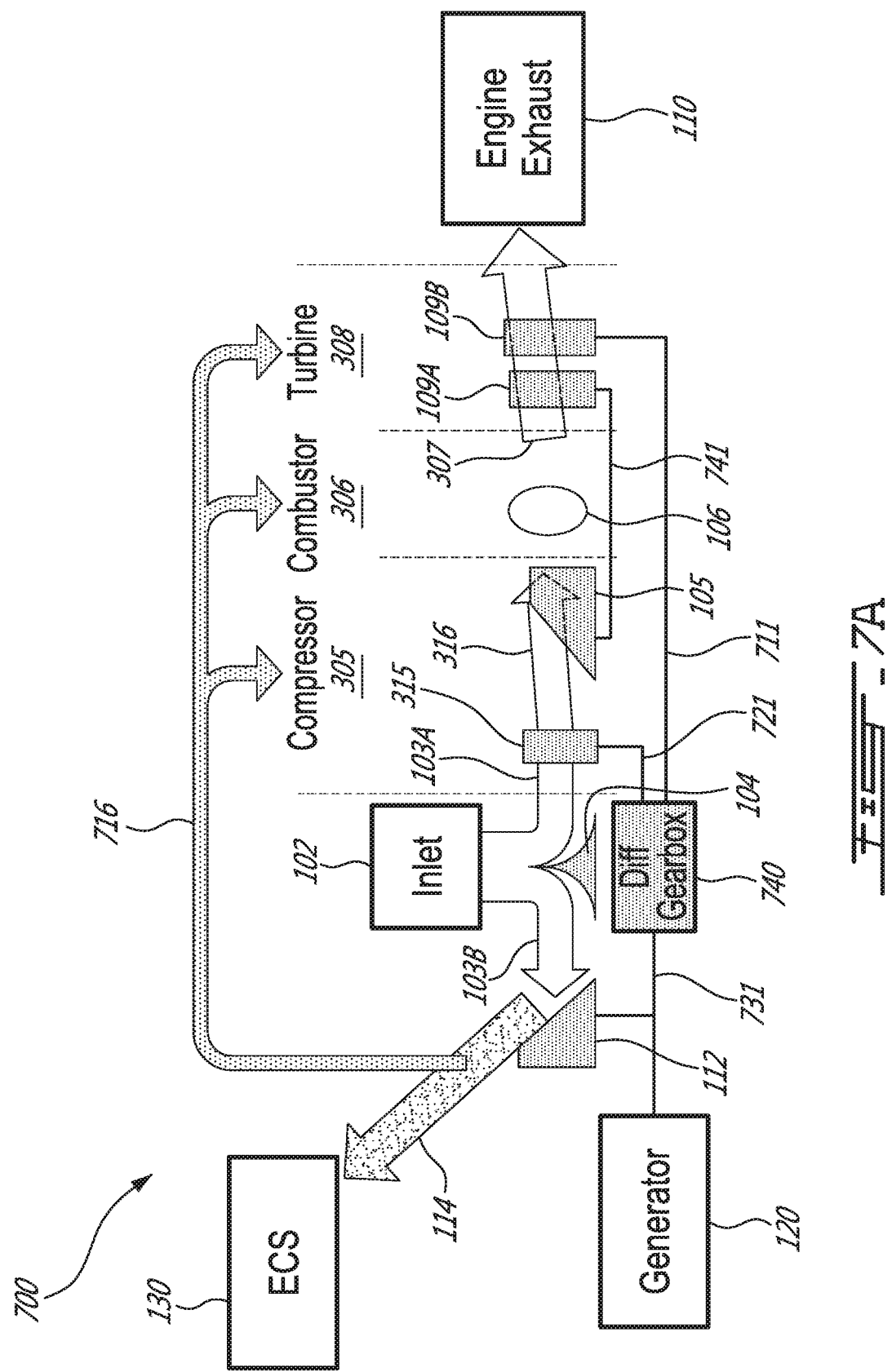
FIG. 7A is a schematic cross-section view of an auxiliary power unit including a boost compressor and in which components are connected through a differential gearbox, in accordance with an embodiment.

FIG. 7A illustrates an auxiliary power unit (APU) 700 including a gas turbine engine for use on an aircraft to supply electric and pneumatic power to the aircraft systems as an auxiliary or secondary source of power, in which components are connected through a differential gearbox. Any other suitable engine may be employed.

As shown in FIG. 7A, APU 700 includes some of the same structure and components as the architecture of APU 300, as described herein, including inlet 102 through which ambient air is drawn, flow splitter 104 for splitting the inlet air into a engine stream air 103A and a load stream air 103B. APU 700 further includes compressor section 305 for pressurizing the engine stream air 103A by way of boost compressor 315, forming boosted compressor stream 316 for further compression by HPC 105 to form further compressed air and then fed to combustor section 306. Combustor section 306 may include, for example, combustor 106, and compressed air is mixed with fuel and ignited for generating an annular combustion stream 307 of hot combustion gases. Turbine section 308 has high-pressure turbine 109A and power turbine 109B for extracting energy from the combustion gases which then exhaust to engine exhaust 110.

Compressor section 305, combustor section 306 and turbine section 308 form part of the gas turbine engine, of which HPC 105, combustor section 306 and high-pressure turbine 109A form an engine core. The gas turbine engine defines a gas path through which gases flow, such as engine stream air 103A, boosted compressor stream 316 and combustion stream 307.

APU 700 further includes LDC 112 for pressurizing load stream air 103B to generate load compressor air 114 for use by ECS 130. In some embodiments, APU 700 may not include a load compressor such as LDC 112.

APU 700 may include a turbine shaft 711, a boost compressor shaft 721, a load shaft 731 and an engine core shaft 741. Turbine shaft 711 connects to power turbine 109B of turbine section 308. Boost compressor shaft 721 connects to boost compressor 315. Load shaft 731 connects to LDC 112 and generator 120. In some embodiments, APU 700 may not include a generator such as generator 120.

As shown in FIG. 7A, turbine shaft 711, and engine core shaft 741 may be mechanically uncoupled, for example, in a dual spool configuration, and therefore may permit separate rotation. Thus, HPC 105 and high-pressure turbine 109A may be mechanically uncoupled from power turbine 109B, and therefore may permit separate rotation.

Turbine shaft 711, boost compressor shaft 721 and load shaft 731 are connected to differential gearbox 740. In some embodiments, differential gearbox 740 may have similar or the same structure and components as differential gearbox 440, or other suitable differential gearbox. Differential gearbox 740 may differ from differential gearbox 440 by having input from power turbine 109B by way of turbine shaft 711 instead of one or more turbines of turbine section 108 connected to a turbine shaft 411 as shown in FIG. 4.

In a similar manner to the configuration of APU 300 shown in FIG. 3, as illustrated in FIG. 7A, the gas turbine engine of APU 700 may have a dual-spool configuration but it is understood that the gas turbine engine may not be limited to such configuration.

FIG. 7B is a schematic diagram of the operating environment of differential gearbox 740 in APU 700. As seen in FIG. 7B, Input of torque to differential gearbox 740 may be from the rotation of power turbine 109B, for example, by way of turbine shaft 711. Output 1 of torque from differential gearbox 740 may rotate boost compressor 315, for example, by way of boost compressor shaft 721. Output 2 of torque from differential gearbox 740 may rotate LDC 112 and/or generator 120, for example, by way of load shaft 731.

Optionally, Input, Output 1 and Output 2 from differential gearbox 740 may be passed through reduction gears (for example, "RGB1" and "RBG2" as shown in FIG. 6) to scale each of the outputs to a desired revolutions per minute to transfer to boost compressor 315, for example, by way of boost compressor shaft 721, and LDC 112 and generator 120, for example, by way of load shaft 731.

Returning to FIG. 7A, engine core shaft 741 connects HPC 105 with high-pressure turbine 109A.

The component configuration shown in FIG. 7A, in particular the use of differential gearbox 740, may allow boost compressor shaft 721, load shaft 731 and engine core shaft 741 to rotate at more effective speeds.

Load shaft 731 may rotate at a fixed speed, while boost compressor shaft 721 and engine core shaft 741 may rotate at faster speed (for example, upon an increase in required power on load shaft 731 by LDC 112 and/or generator 120) and may rotate at variable speeds in relation to each other.

Allowing the speed of boost compressor shaft 721 to vary as the required power of LDC 112 and generator 120 varies may optimize boost compressor 315 and may allow boost compressor 315 to operate without the need for expensive variable geometry (inlet guide vanes) and handling bleed valves.

The power demand of LDC 112 and generator 120 may drive the boost provided by boost compressor 315. As power required by LDC 112 or generator 120 increases, boost compressor 315 may speed up to operate APU 700 at a higher power. As power required by LDC 112 or generator 120 decreases, then the speed of boost compressor 315 may reduce. Thus, boost compressor 315 may provide as much pressure as needed. Differential gearbox 740 and the separation of boost compressor shaft 721 from turbine shaft 711 allows boost compressor 315 to have a different speed than power turbine 109B.

By separating the rotation of HPC 105 and high-pressure turbine 109A (connected by engine core shaft 741) from power turbine 109B (connected to differential gearbox 740 by turbine shaft 711), may allow for a desired pressure ratio and allow APU 700 to operate at an efficient level, and provide a location at power turbine 109B to inject excess load compressor air that is lower pressure than load compressor air 114, as discussed in further detail below.

The components of APU 700 may be manufactured using conventional machining or casting.

In some embodiments, APU 700 may also include a bypass excess air pathway or conduit establishing fluid communication between LDC 112 and the gas path of the gas turbine engine, in combination with a controller and one or more bypass valves for controlling and directing the flow of excess load compressor air 716 generated by LDC 112 (for example, excess load compressor air not required by ECS 130).

Excess load compressor air 716 may be directed along an excess air pathway to be injected into the gas path of the gas turbine engine upstream of a turbine of the gas turbine engine, for example, adjacent one or more of high-pressure turbine 109A and power turbine 109B in turbine section 308.

Injection of excess load compressor air 716 into turbine section 308 may assist in the rotation of one or more of high-pressure turbine 109A and power turbine 109B of turbine section 308.

In some embodiments, excess load compressor air 716 may be directed along an excess air pathway to be injected at combustor section 306 and/or any of the stages of compression upstream of combustor section 306.

Excess load compressor air 716 may be directed along the excess air pathway to be injected at a location of lower pressure than load compressor air 114 within APU 300, for example, upstream of power turbine 109B and downstream of high-pressure turbine 109A. Thus, backflow of excess load compressor air 716 may be avoided.

In some embodiments, a detector may detect the load of load compressor air 114 required by ECS 130, and used to redirect load compressor air 114 and excess load compressor air 716 as needed.

Conveniently, redirecting excess load compressor air 716 into the gas path or power generation sections of APU 700 (such as compressor section 305, combustor section 306 and turbine section 308) may take advantage of the work applied to load compressor air 114 and may improve the overall performance of APU 700.

FIG. 8 illustrates a turboprop (or turboshaft) engine 800, in accordance with an embodiment. Turboprop engine 800 may include some of the same structure and components as the architecture of APU 700, as described herein.

Ambient air is drawn into turboprop engine 800 by way of engine inlet 802, which is then pressurized by boost compressor 315. Boost compressor 315 generates a boosted compressor stream 316 for further compression by HPC 105 and then fed to combustor section 306. Combustor section 306 may include, for example, combustor 106, and compressed air is mixed with fuel and ignited for generating an annular combustion stream 307 of hot combustion gases. Turbine section 308 has high-pressure turbine 109A and power turbine 109B for extracting energy from the combustion gases which then exhaust to engine exhaust 110.

Compressor section 305, combustor section 306 and turbine section 308 form part of an engine core. Turboprop engine 800 defines a gas path through which gases flow, such intake air from engine inlet 802, boosted compressor stream 316 and combustion stream 307.

Turboprop engine 800 may include a turbine shaft 811, a boost compressor shaft 821, an output shaft 831 and high-pressure shaft 841. Turbine shaft 811 connects to power turbine 109B of turbine section 308. Boost compressor shaft 821 connects to boost compressor 315. Output shaft 831 may replace load shaft 731, connecting to a propeller or shaft 860 by way of a (e.g., speed reduction) gearbox 850.

Turbine shaft 811, boost compressor shaft 821 and output shaft 831 are connected to a differential gearbox 840. In some embodiments, differential gearbox 840 may have similar or the same structure and components as differential gearbox 440 or differential gearbox 740, or other suitable differential gearbox.

High-pressure shaft 841 connects HPC 105 with high-pressure turbine 109A.

The component configuration shown in FIG. 8, in particular the use of differential gearbox 840, may allow boost compressor shaft 821 and turbine shaft 811 to run at variable speeds, as compared to the generally fixed speed of output shaft 831.

Variable boost speed (of boost compressor shaft 821, and thus boost compressor 315) may allow for more optimal compressor running lines, without the need for inlet guide vanes or handling bleed valves.

Figure 9:
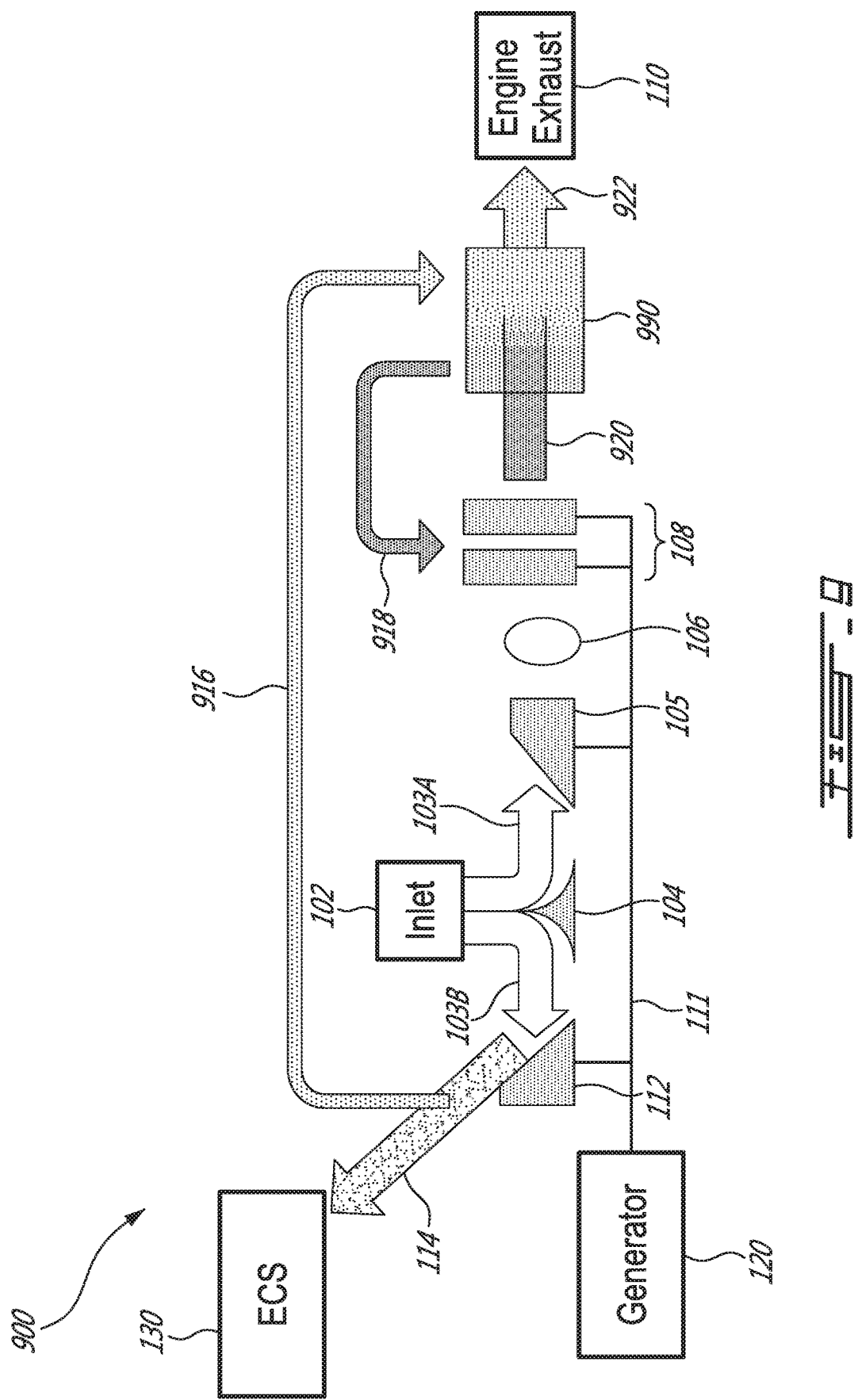
FIG. 9 is a schematic cross-section view of an auxiliary power unit in which excess load compressor air is directed to a recuperator.

FIG. 9 is a schematic cross-section view of an auxiliary power unit (APU) 900 including a gas turbine engine for use on an aircraft to supply electric and pneumatic power to the aircraft systems as an auxiliary or secondary source of power, in which excess load compressor air 916 is directed to a recuperator 990. Any other suitable engine may be employed.

As shown in FIG. 9, APU 900 includes some of the same structure and components as the architecture of APU 100, including inlet 102, flow splitter 104, engine stream air 103A, load stream air 1038, compressor 105, combustor 106, turbine section 108, engine exhaust 110, power shaft 111, LDC 112, load compressor air 114, generator 120 and ECS 130, as described herein.

HPC 105, combustor 106 and turbine section 108 form part of the gas turbine engine, defining a gas path through which gases flow and exit the gas turbine engine as exhaust air 920, as illustrated in FIG. 9.

As shown in FIG. 9, APU 900 may also include recuperator 990 downstream of the gas turbine engine. Recuperator 990 may be a heat exchanger used to extract heat from exhaust air 920 and preheat air such as excess load compressor air 916, thus providing heat exchange between exhaust air 920 and excess load compressor air 916 prior to injecting the excess load compressor air 916 into the gas path of the gas turbine engine of APU 900.

APU 900 may also include a bypass excess air pathway or conduit establishing fluid communication between LDC 112 and recuperator 990, in combination with a controller and one or more bypass valves for controlling and directing the flow of excess load compressor air 916 generated by LDC 112.

APU 900 may also include a bypass excess air pathway or conduit establishing fluid communication between recuperator 990 and the gas path of the gas turbine engine in combination with a controller and one or more bypass valves for controlling and directing the flow of heated excess load compressor air 918 from recuperator 990.

In use, as LDC 112 rotates, LDC 112 will generate load compressor air 114. As shown in FIG. 9, if more load compressor air 114 is generated by LDC than is required by ECS 130, unused excess load compressor air 916 may be released by a bleed valve (not shown) and directed to be injected into recuperator 990.

Exhaust air 920, upon passing through turbine section 108, is directed to recuperator 990. Excess load compressor air 916 is directed along an excess air pathway to be injected at recuperator 990. Due to energy transfer within recuperator 990, relatively cool excess load compressor air 916 may be heated by the relatively hot exhaust air 920, forming heated excess load compressor air 918 and cooled exhaust air 922 which vents to engine exhaust 110.

As also shown in FIG. 9, heated excess load compressor air 918 may be directed along an excess air pathway to be injected, for example, adjacent one or more turbines in turbine section 108. Injection of heated excess load compressor air 918 into turbine section 108 may assist in the rotation of one or more turbines of turbine section 108.

In some embodiments, heated excess load compressor air 918 may be injected at other locations along the gas path of the gas turbine engine. For example, heated excess load compressor air 918 may be directed along an excess air pathway to be injected at combustor 106 and/or any of the stages of compression upstage of combustor 106.

Heated excess load compressor air 918 may be directed along an excess air pathway to be injected at an area within APU 900 of lower pressure than load compressor air 114. Thus, backflow of heated excess load compressor air 918 may be avoided.

In some embodiments, a detector may detect the load of load compressor air 114 required by ECS 130, to redirect load compressor air 114 and excess load compressor air 916 as needed.

Conveniently, redirecting heated excess load compressor air 918 into power generation sections of APU 900 (such as turbine section 108, combustor 106 and HPC 105) may take advantage of the work applied to load compressor air 114 and may improve the overall performance of APU 900. The use of heated excess load compressor air 918 into power generation sections of APU 900 may provide further efficiency improvement over the use of injecting unheated excess load compressor air. Capturing the exhaust stream energy from exhaust air 920 may improve the system efficiency of APU 900 and may reduce heat rejection to the surroundings and reduce fuel burn.

A low pressure of excess load compressor air 916 as compared to exhaust air 920 (for example, a pressure ratio of 4.5), may allow thinner walls to be used in recuperator 990. A large temperature difference between excess load compressor air 916 and exhaust air 920 may also improve efficiency.

A recuperator such as recuperator 990 may be included with any of the APUs or gas turbine engines disclosed herein, such as APU 100, APU 200, APU 300, APU 400, APU 700, turboprop engine 800, to recuperate excess load compressor air using techniques described herein. In some embodiments, recuperator 990 and redirection of excess load compressor air 916 may be retrofitted on an existing gas turbine engine or APU.

Of course, the above described embodiments are intended to be illustrative only and in no way limiting. The described embodiments are susceptible to many modifications of form, arrangement of parts, details and order of operation. The disclosure is intended to encompass all such modification within its scope, as defined by the claims.

What is claimed is:

1. A gas turbine engine system, comprising:
a boost compressor configured to compress air;
a high pressure compressor configured to receive compressed air from the boost compressor and further compress the compressed air, the high pressure compressor separately rotatable from the boost compressor;
a combustor in which the compressed air further compressed by the high pressure compressor is mixed with fuel and ignited to generate a stream of combustion gases; and
a turbine configured to extract energy from the combustion gases, the turbine being drivingly coupled to the boost compressor and to an output shaft via a differential gearbox configured to apportion an input torque from the turbine between a first output torque applied to the output shaft and a second output torque applied to the boost compressor,
wherein the differential gearbox comprises a first epicyclic gear set having a first sun gear rotatable about a first axis, a first ring gear rotatable about the first axis, one or more first planet gears, and a first carrier rotatable about the first axis; and the system further comprises:
a second epicyclic gear set having a second sun gear rotatable about a second axis, a second ring gear rotatable about the second axis, one or more second planet gears, and a second carrier rotatable about the second axis; and a third epicyclic gear set having a third sun gear rotatable about a third axis, a third ring gear rotatable about the third axis, one or more third planet gears, and a third carrier; wherein:

the first sun gear is drivingly coupled to the boost compressor, the first ring gear is fixed, the first carrier ring is drivingly coupled to the second ring gear, the second sun gear is drivingly coupled to the turbine, the second carrier is drivingly coupled to the third ring gear, the third sun gear is drivingly coupled to the output shaft, and the third carrier is fixed.

2. The system of claim 1, wherein the first output torque is different from the second output torque.

3. The system of claim 1, wherein a rotational speed ratio between the output shaft and the turbine is different from a rotational speed ratio between the boost compressor and the turbine.

4. The system of claim 1, wherein the output shaft is drivingly coupled to a load compressor, configured to generate compressed air for an environmental control system of an aircraft, and an electric generator.

5. The system of claim 1, further comprising:

a load compressor drivingly coupled to the output shaft and configured to generate compressed air for an environmental control system of an aircraft; and a conduit establishing fluid communication between the load compressor and an injection location in a gas path of the gas turbine engine to direct at least some of the compressed air generated by the load compressor to the injection location, the injection location being upstream of the turbine of the gas turbine engine.

6. The system of claim 4, further comprising a recuperator configured to facilitate heat transfer from exhaust gas from the gas turbine engine to compressed air generated by the load compressor before injecting the compressed air generated by the load compressor in the gas path of the gas turbine engine.

7. The system of claim 1, wherein the output shaft is drivingly coupled to a propeller via a reduction gearbox.

8. The system of claim 1, wherein the first epicyclic gear seat is a first reduction gearbox.

9. The system ci claim 8, wherein the third epicyclic gear set is a second reduction gearbox.

10. The system of claim 1, wherein the differential gearbox includes a compound epicyclic gear set.

* * * * *